United States Patent [19]

Torii et al.

[11] Patent Number: 4,916,636
[45] Date of Patent: Apr. 10, 1990

[54] SYSTEM FOR CONTROLLING ACCELERATION AND DECELERATION OF HORIZONTALLY ARTICULATED ROBOT

[75] Inventors: Nobutoshi Torii, Hachioji; Susumu Ito; Akihiro Terada, both of Hino, all of Japan

[73] Assignee: Fanuc Ltd., Minamitsuru, Japan

[21] Appl. No.: 49,860

[22] PCT Filed: Sep. 11, 1986

[86] PCT No.: PCT/JP86/00468

§ 371 Date: Jun. 11, 1987

§ 102(e) Date: Jun. 11, 1987

[87] PCT Pub. No.: WO87/01833

PCT Pub. Date: Mar. 26, 1987

[30] Foreign Application Priority Data

Sep. 11, 1985 [JP] Japan .................. 60-200816

[51] Int. Cl.$^4$ .............. G06F 15/46; G05B 19/407
[52] U.S. Cl. .................. 364/513; 318/568.18; 901/2; 901/15; 901/20
[58] Field of Search .............. 364/513, 167–171, 364/191–193, 474, 475, 474.28, 474.3; 414/730; 901/15, 20, 2; 318/568, 568.11, 568.18

[56] References Cited

U.S. PATENT DOCUMENTS

| | | | |
|---|---|---|---|
| 4,494,060 | 1/1985 | Chitayat et al. | 364/513 X |
| 4,506,335 | 3/1985 | Magnuson | 901/20 X |
| 4,528,632 | 7/1985 | Nio et al. | 901/20 X |
| 4,535,405 | 8/1985 | Hill et al. | 364/400 |
| 4,594,670 | 6/1986 | Itoh | 901/15 X |
| 4,598,380 | 7/1986 | Holmes et al. | 901/20 X |

FOREIGN PATENT DOCUMENTS 60-57407 4/1985 Japan .

Primary Examiner—Joseph Ruggiero
Attorney, Agent, or Firm—Staas & Halsey

[57] ABSTRACT

A system for controlling acceleration and deceleration of a horizontally articulated robot computes the distance from the center of rotation of the robot (A) having a plurality of arms (3, 5) angularly movable in horizontal planes to a reference position such as a wrist (51) at the distal end of the arms (3, 5), and establishes an acceleration for the movement of the distal end of the arms (3, 5). A servomotor for angularly moving the arms (3,5) can effectively be utilized and the arms (3, 5) can quickly and smoothly be moved.

4 Claims, 4 Drawing Sheets

4,916,636

SYSTEM FOR CONTROLLING ACCELERATION AND DECELERATION OF HORIZONTALLY ARTICULATED ROBOT

TECHNICAL FIELD

The present invention relates to a system for controlling acceleration and deceleration of a horizontally articulated robot having a plurality of arms that are angularly movable in horizontal planes.

BACKGROUND ART

In a system for controlling axis movement of a robot having a plurality of movable axes, acceleration and deceleration control is generally effected so as not to impose shocks and vibration on a mechanical system when starting and stopping the axis movement.

There has been developed in recent years a horizontally articulated robot having a plurality of arms that are angularly movable in horizontal planes, for use in work where many jobs are carried out in horizontal planes, such as for assembling semiconductors or installing electronic parts on printed-circuit boards. The horizontally articulated robot is basically constructed of a first swing arm mounted on the distal end of a post erected on a bed fixed to a floor, the first swing arm being angularly movable horizontally, a second swing arm having one end swingably attached to the distal end of the first swing arm, the second swing arm being angularly movable horizontally, and a wrist mounted on the distal end of the second swing arm. When an object to be moved is gripped by the wrist of the horizontally articulated robot and the swing arms are angularly moved, acceleration and deceleration of a servomotor are controlled initial and final periods of angular movement of the swing arms for smoothly turning the swing arms.

The conventional system for controlling acceleration and deceleration of a horizontally articulated robot having a plurality of arms that are angularly movable in horizontal planes, has a drive source which can produce a torque great enough to move the object in a position remotest from the center of rotation of the arms. In the conventional control system, even when the object is located more closely to the center of rotation of the arms than the remotest position, the object has been moved at the same low acceleration as that when the object is located in the remotest position. Therefore, the time required to move the object is long and the ability of the drive source is not sufficiently utilized.

SUMMARY OF THE INVENTION

The present invention is a novel invention made to eliminate the aforesaid shortcomings. It is an object of the present invention to provide a system for controlling acceleration and deceleration of a horizontally articulated robot, the system being capable of effectively utilizing a servomotor which drives arms and of quickly moving the arms.

According to the present invention, there is provided a system for controlling acceleration and deceleration of a horizontally articulated robot having a plurality of arms that are angularly movable in horizontal planes, the system comprising processing means for computing the distance from the center of rotation of the arms to a reference position at the distal end of the arms, and accelerating/decelerating means responsive to the computed distance for setting an acceleration for movement of the distal end of the arms.

When a command is issued for moving an object gripped by a wrist, the distances from the center of rotation of the arms to an initial position of the object and a reached position thereof are immediately computed, then accelerations to be effected when the distal arm end is accelerated and decelerated are computed, and points to start acceleration and deceleration of the robot are varied dependent on the distance from the center of rotation of the arms.

DESCRIPTION OF THE PREFERRED EMBODIMENT

An embodiment of the present invention will hereinafter be described in specific detail with reference to the drawings.

Figure 1:
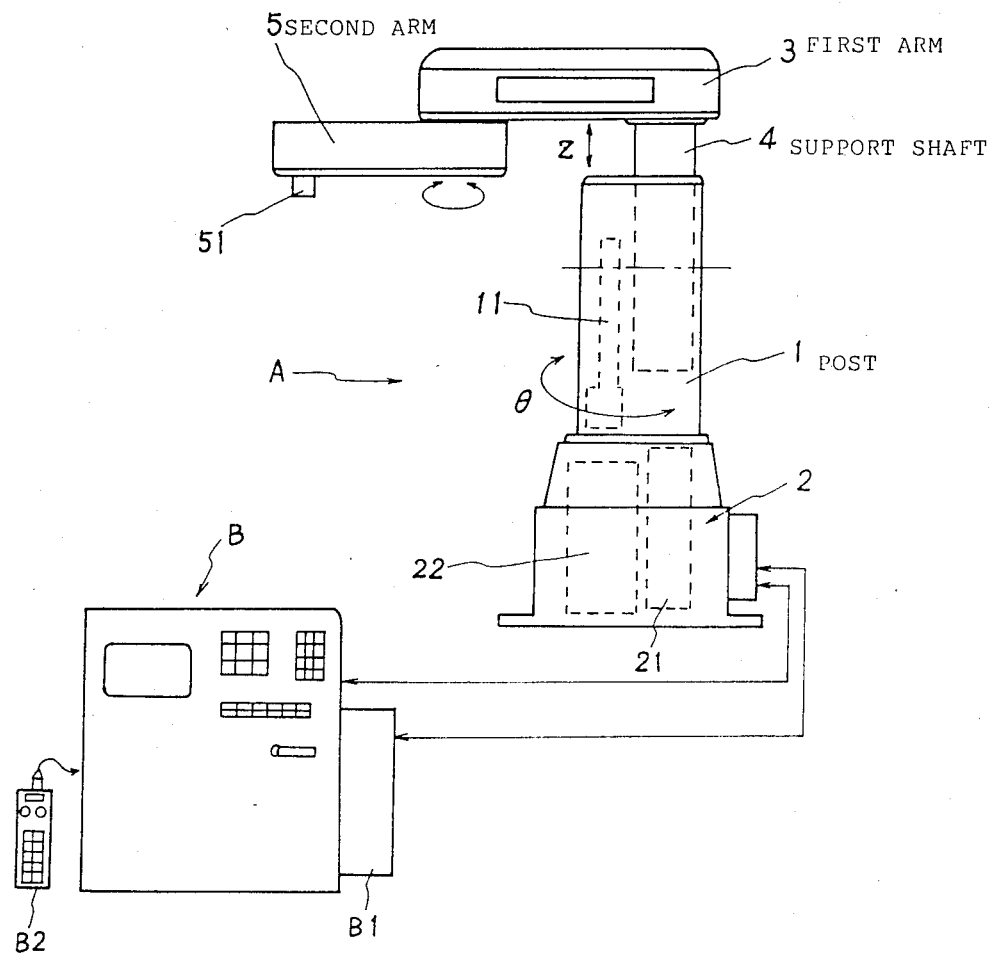
FIG. 1 is a view showing the arrangement of a horizontally articulated robot according to the present invention.

FIG. 1 is a view showing by way of example a horizontally articulated industrial robot including an angularly movable post 1 on a bed 2 installed on a floor. Designated at A is a robot mechanism including a post 1 mounted on a bed 2 and angularly movable in a prescribed angular range ($\theta$) and a turning mechanism 21 disposed in the bed 2 for angularly moving the post 1.

A first arm 3 is horizontally supported by a support shaft 4 inserted in the post 1, and a second arm 5 which is horizontally angularly movable is mounted on the distal end of the first arm 3. A wrist 51 is attached to the distal end of the second arm 5. The bed 2 houses therein a drive mechanism 22 vertically movable within a prescribed range (Z) for controlling the height of the arm 3, the drive mechanism 22 being capable of vertically actuating the support shaft 4 to control the height of the first arm (operation arm). The first arm 3 houses therein a drive mechanism for turning the second arm, and the second arm 5 houses therein a drive mechanism for driving the wrist 51. Although not shown in FIG. 1, the wrist 51 usually has fingers for gripping objects so that the wrist 51 can grip tools or objects to be moved.

· Designated in FIG. 1 at B is a robot control system comprising a numerical control device in the form of a computer. The robot control system B has a programmable sequence controller B1 for controlling power electric units such as various servomotors in the robot mechanism A, and a teach control unit B2.

Figure 2:
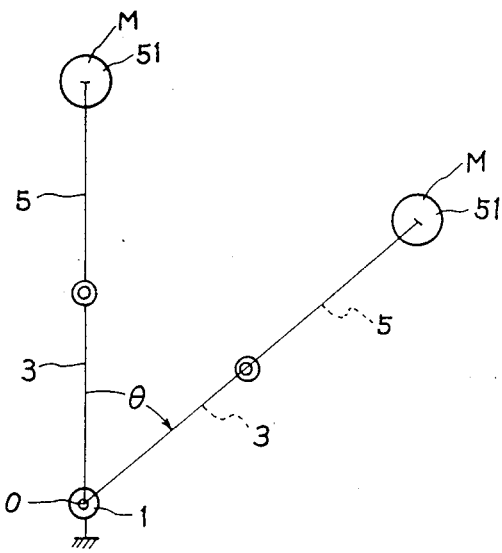
FIG. 2 is a schematic view showing the arrangement of arms.

As shown in FIG. 2, the first and second arms 3, 5 are angularly movable in prescribed horizontal planes around the center O of rotation of the post 1. Since an object M to be moved which is gripped by the wrist 51 can be moved along a path which is not affected by gravity, when the object M is turned through $\theta$ degrees about the center O of rotation, a torque T applied to a servomotor of the turning mechanism 21 is expressed by:

$$T = Ix(a\omega) \quad (1)$$

where I is the force of inertia of the object M and $(a\omega)$ is an angular acceleration. More specifically, as shown in FIG. 2, when the first and second arms 3, 5 move the object M while they are extending in line, the torque T applied to the post 1 as expressed by the equation (1) is maximized, and when the first and second arms 3, 5 are collapsed to minimize the distance from the center O of rotation to the object M, the torque T is minimum. In the robot of this type, the output of the servomotor is determined to meet the maximum torque for operational stability.

Figure 3:
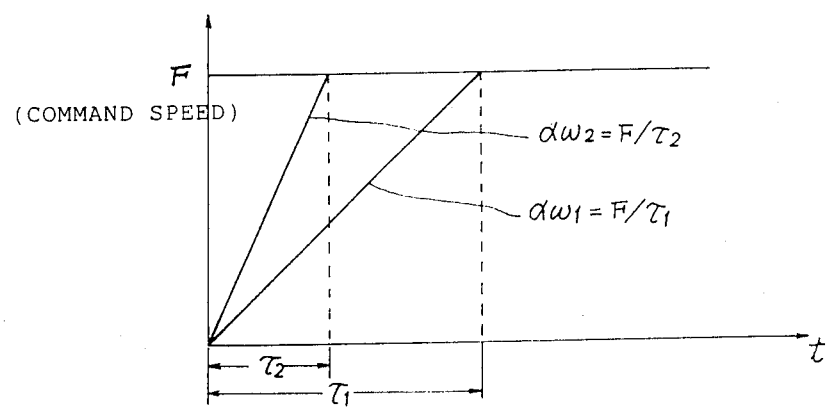
FIG. 3 is a diagram explaining acceleration.

FIG. 3 shows how the rotational angular velocity varies from a movement starting point when the robot is given a command speed F. In the present invention, when the object M is at a remotest point, the maximum angular acceleration $(a\omega 1)$ applied to the object M is set as follows:

$$(a\omega 1) = F/\tau 1 \quad (2)$$

and when the object M is at a closest point, the maximum angular acceleration $(a\omega 2)$ applied to the object M is set as follows:

$$(a\omega 2) = F/\tau 2 \quad (3)$$

These angular accelerations $(a\omega 2)$, $(a\omega 1)$ are thus dependent on time constants $\tau 1$, $\tau 2$ ($\tau 1 > \tau 2$). The angular acceleration $a\omega 2$ at the closest point can be increased to a maximum value withing an allowable range by making it equal to a value obtained by the same servomotor when its output is fully produced.

Figure 4:
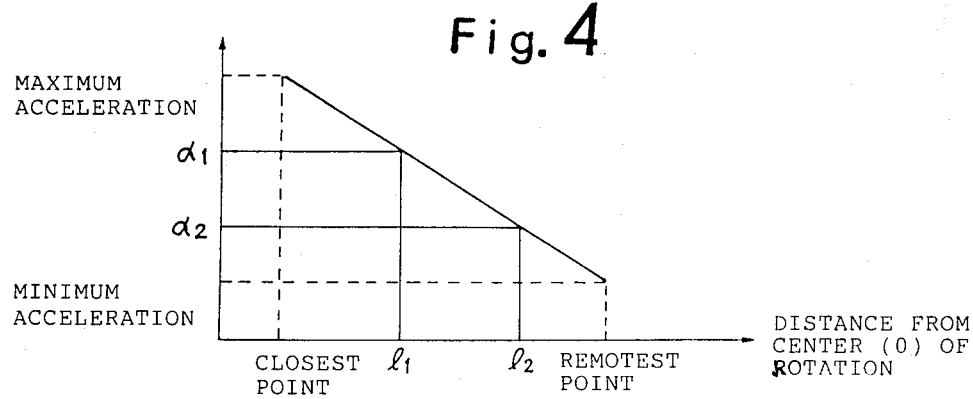
FIG. 4 is a diagram explanatory of an acceleration table.

FIG. 4 shows an acceleration table with the horizontal axis indicating the distance from the center O of rotation to the object M and the vertical axis indicating the acceleration. This acceleration table can be prepared by using accelerations calculated from command speeds F found from the equations (2), (3). Therefore, if the distance from the center O of rotation to the object M is given, an acceleration that can be imposed on the object M can be determined according to the distance.

Figure 5:
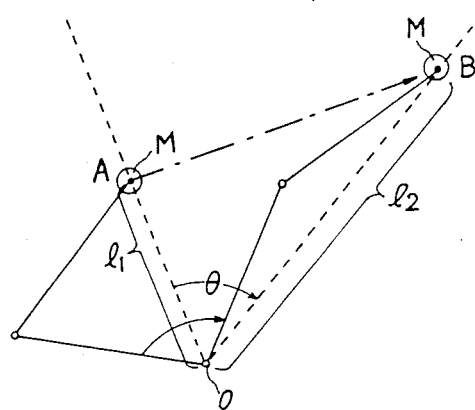
FIG. 5 is a schematic view explaining movement of the arms.
Figure 6:
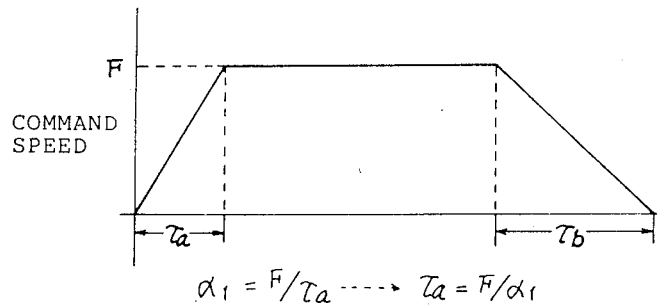
FIG. 6 is a diagram showing acceleration/deceleration characteristics.
Figure 7:
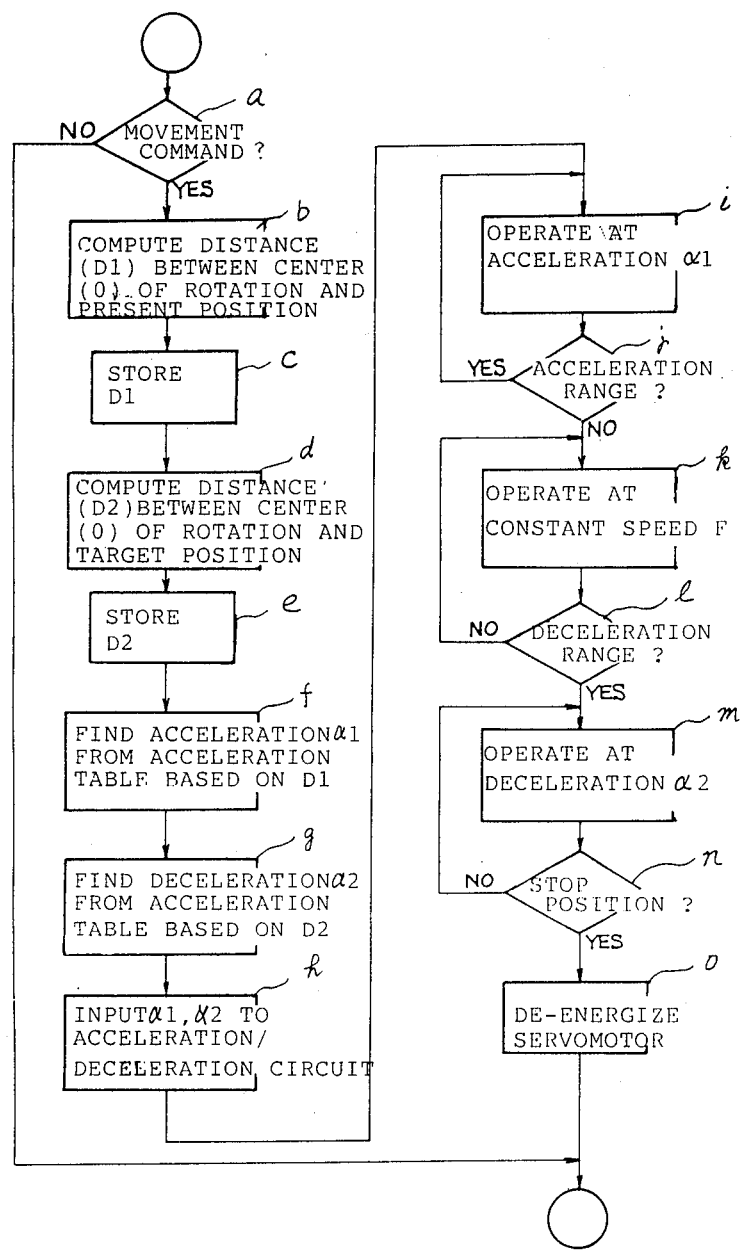
FIG. 7 is a flowchart of operation.

Accelerating/decelerating operation for moving the object M from a point A to a point B by turning the arms through the $\theta$ degrees as shown in FIG. 5 will be described with reference to the flowchart of FIG. 7. FIG. 6 shows acceleration/deceleration characteristics with respect to the command speed F.

The numerical control device ascertains in a step a whether a movement command has been issued for the object M. If a movement command for the object M has been issued, then a distance D1 between the center O of rotation and a present position A is measured in a step b. The distance D1 can quickly be measured by referring to a present position counter which indicates the present position of the reference point at the wrist. The measured distance D1 is stored in a temporary memory in the numerical control device in a step c. Then, a distance D2 between the center O of rotation and a next position of the object M is measured in a step d. The distance D2 can be measured by referring to a movement command position commanded by the next block of data. The measured value D2 is stored in the temporary memory in the numerical control device in a step e.

Thereafter, an acceleration $\alpha 1$ is found from the acceleration table based on the measured value D1 stored in the memory in a step f, and a deceleration $-\alpha 2$ is found from the acceleration table based on the measured value D2 stored in the memory in a step g. In a next step h, the acceleration $\alpha 1$ and the deceleration $-\alpha 2$ are input from the numerical control device to the programmable controller B1 or an acceleration/deceleration circuit in the robot mechanism A. The acceleration/deceleration circuit applies a pulse having acceleration characteristics as shown in FIG. 6 based on the input acceleration $\alpha 1$ to the servomotor in the turning mechanism 21 for acceleration control in a step i. If an acceleration range is past, the acceleration control is finished in a step j, and the servomotor is operated at a constant speed in a step k. If the object M approaches the target point B, entering a deceleration range in a step 1, then the acceleration/deceleration circuit applies a pulse having deceleration characteristics as shown in FIG. 6 based on the input deceleration $-\alpha 2$ to the servomotor in the turning mechanism 21 for deceleration control in a step m. Upon completion of the deceleration control or arrival at a stop position in a step n, the servomotor is de-energized in a step o.

While the acceleration/deceleration circuit has been described as being a known linear acceleration/deceleration circuit of the variable time-constant type, an acceleration/deceleration circuit of the exponential function type may be used, and acceleration and deceleration may be determined as described above for acceleration and deceleration control using such a circuit. Moreover, while acceleration and deceleration have been found from the acceleration table in the above embodiment, they may be computed from the distances from the starting and ending points of the object M to the center of rotation and acceleration and deceleration control may be carried out using such computed distances.

With a system for controlling acceleration and deceleration of a horizontally articulated robot according to the present invention, acceleration and deceleration of a reference point at the distal end of arms of the robot can be varied dependent on the distance from the reference point to the center of rotation of the arms in horizontal planes. A servomotor which rotates the arms can effectively be utilized, and the arms can quickly and smoothly be moved.

What is claimed is:

1. A system for controlling acceleration and deceleration of a horizontally articulated robot having a plurality of arms, coupled together to form an arm member having base and distal ends, and angularly movable, relative to a center of rotation at the base end of the arm member, in horizontal planes, said system comprising:
    processing means for computing a distance from the center of rotation at the base end of the arm member to a reference position at the distal end of the arm member; and
    accelerating/decelerating means for setting an acceleration/deceleration rate for movement of the distal end of the arm member in dependence upon the distance computed by said processing means.

2. A system according to claim 1, wherein the arms have a wrist attachment portion at the distal end of the arm member used to determine the reference position.

3. A system according to claim 1, wherein said acceleration/decelerating means includes an acceleration table storing absolute values of acceleration/deceleration inversely proportional to the distance.

4. A system according to claim 1, wherein said accelerating/decelerating means comprises a variable time-constant type linear acceleration/deceleration circuit for establishing the acceleration/deceleration rate when the arms are to be accelerated and decelerated.

* * * * *